US009755950B2

(12) United States Patent
Butler et al.

(10) Patent No.: US 9,755,950 B2
(45) Date of Patent: Sep. 5, 2017

(54) PATH ROUTING FOR COMMUNICATION SESSIONS

(71) Applicant: Microsoft Technology Licensing, LLC, Redmond, WA (US)

(72) Inventors: Michael W. Butler, Seattle, WA (US); Pascal F. Menezes, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 385 days.

(21) Appl. No.: 14/057,830

(22) Filed: Oct. 18, 2013

(65) Prior Publication Data

US 2015/0113164 A1 Apr. 23, 2015

(51) Int. Cl.
*G06F 15/16* (2006.01)
*H04L 12/707* (2013.01)
*H04L 12/24* (2006.01)
*H04L 12/825* (2013.01)
*H04L 12/721* (2013.01)
*H04L 12/703* (2013.01)
*H04L 12/725* (2013.01)
*H04L 12/717* (2013.01)

(52) U.S. Cl.
CPC ............ *H04L 45/22* (2013.01); *H04L 41/50* (2013.01); *H04L 47/26* (2013.01); *H04L 45/123* (2013.01); *H04L 45/28* (2013.01); *H04L 45/302* (2013.01); *H04L 45/42* (2013.01)

(58) Field of Classification Search
CPC combination set(s) only.
See application file for complete search history.

(56) References Cited

U.S. PATENT DOCUMENTS 6,804,532 B1 * 10/2004 Moon ................ H04L 45/22
370/252
6,904,110 B2 6/2005 Trans et al.
(Continued)

FOREIGN PATENT DOCUMENTS

EP 2469762 6/2012
WO WO-2004040423 5/2004

OTHER PUBLICATIONS

"International Search Report and Written Opinion", Application No. PCT/US2014/060318, Jan. 8, 2015, 11 Pages.
(Continued)

*Primary Examiner* — Aftab N. Khan

(57) ABSTRACT

Techniques for path routing for communication sessions are described. In at least some embodiments, a communication session refers to an exchange of communication data between different nodes in a network. According to various embodiments, a routing path for a communication session includes peering points between different networks to enable communication sessions to be routed between devices connected to the different networks. In an event that performance degradation occurs in a communication session over a particular routing path, techniques discussed herein enable the communication session to be rerouted to a different routing path. The different routing path, for example, may be indicated as providing a higher quality data flow than the original routing path. Thus, rerouting the communication session can improve the quality of user experience during the communication session.

20 Claims, 10 Drawing Sheets

(56) References Cited

U.S. PATENT DOCUMENTS

| | | | | |
|---|---|---|---|---|
| 7,586,899 | B1* | 9/2009 | Mohaban | H04L 29/06027 370/352 |
| 9,043,453 | B1* | 5/2015 | Kielhofner | H04L 41/50 709/223 |
| 2004/0264372 | A1* | 12/2004 | Huang | H04L 45/00 370/230 |
| 2005/0254430 | A1* | 11/2005 | Clark | H04L 45/00 370/241 |
| 2008/0052394 | A1* | 2/2008 | Bugenhagen | H04L 12/14 709/224 |
| 2008/0095058 | A1* | 4/2008 | Dalmases | H04L 45/00 370/237 |
| 2008/0104596 | A1 | 5/2008 | Buonanno et al. | |
| 2008/0279183 | A1* | 11/2008 | Wiley | H04L 29/06027 370/389 |
| 2009/0049129 | A1 | 2/2009 | Faisal et al. | |
| 2009/0213844 | A1* | 8/2009 | Hughston | H04M 3/4872 370/352 |
| 2012/0287827 | A1 | 11/2012 | Denne et al. | |
| 2013/0070620 | A1* | 3/2013 | Trabelsi | H04L 65/1043 370/252 |
| 2013/0132285 | A1* | 5/2013 | Richards et al. | 705/300 |
| 2013/0205002 | A1* | 8/2013 | Wang | H04L 69/16 709/224 |
| 2014/0341037 | A1* | 11/2014 | Racz | H04L 47/122 370/235 |
| 2014/0376361 | A1* | 12/2014 | Hui | H04L 41/0654 370/221 |

OTHER PUBLICATIONS

"Simply Connected for Unified Communications and Collaboration (UC&C) Reference Architecture", Retrieved from <http://www.juniper.net/us/en/local/pdf/reference-architectures/8030010-en.pdf>, Jul. 6, 2013, 24 pages.

"New and Changed for Cisco Unified Communications Manager 8.5(1)", Retrieved from <http://www.cisco.com/en/US/docs/voice_ip_comm/cucm/rel_notes/8_5_1/delta/delta.html#wp1854257> on Aug. 1, 2013, Dec. 19, 2010, 63 pages.

"Benefits of Deploying Unified Communications on a Cisco Integrated Network", Retrieved from <http://www.cisco.com/en/US/prod/collateral/voicesw/ps6882/ps6884/solution_overview_c22-484573.html> on Aug. 2, 2013, Dec. 18, 2008, 8 pages.

"Second Written Opinion", Application No. PCT/US2014/060318, Sep. 11, 2015, 7 pages.

"International Preliminary Report on Patentability", Application No. PCT/US2014/060318, Jan. 25, 2016, 8 pages.

* cited by examiner

PATH ROUTING FOR COMMUNICATION SESSIONS

BACKGROUND

Modern communication systems have an array of capabilities, including integration of various communication modalities with different services. For example, instant messaging, voice/video communications, data/application sharing, white-boarding, and other forms of communication may be combined with presence and availability information for subscribers. Such systems may provide subscribers with the enhanced capabilities such as providing instructions to callers for various status categories, alternate contacts, calendar information, and comparable features. Furthermore, collaboration systems enabling users to share and collaborate in creating and modifying various types of documents and content may be integrated with multimodal communication systems providing different kinds of communication and collaboration capabilities. Such integrated systems are sometimes referred to as Unified Communication and Collaboration (UC&C) systems.

While UC&C systems provide for increased flexibility in communications, they also present a number of implementation challenges. For instance, a UC&C system typically utilizes multiple interconnected networks to route various communications. Since different networks may be managed by different entities, challenges thus arise in maintaining communications quality for communications that are routed among independently managed networks. Further, UC&C is typically implemented via software that can be loaded on mobile devices, e.g., tablets, smartphones, laptops, and so forth. Thus, techniques for managing UC&C communication traffic typically have to be fluid and dynamic to accommodate changing connection scenarios.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for path routing for communication sessions are described. In at least some embodiments, a communication session refers to an exchange of communication data between different nodes in a network. Examples of a communication session include a Voice over Internet Protocol (VoIP) call, a video call, text messaging, a file transfer, and/or combinations thereof. In at least some embodiments, a communication session represents a Unified Communication and Collaboration (UC&C) session.

According to various embodiments, a routing path for a communication session includes peering points between different networks. For instance, a local access provider (LAP) network can peer with a communication service network (e.g., a UC&C network) to enable communication sessions to be routed between devices connected to the different networks. In an event that performance degradation occurs in a communication session over a particular routing path, techniques discussed herein enable the communication session to be rerouted to a different routing path. The different routing path, for example, may be indicated as providing a higher quality data flow than the original routing path. Thus, rerouting the communication session can improve the quality of user experience during the communication session. As discussed herein, a communication session can be rerouted independent of user input and without interrupting or disconnecting the communication session.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for path routing for communication sessions are described. In at least some embodiments, a communication session refers to an exchange of communication data between different nodes in a network. Examples of a communication session include a Voice over Internet Protocol (VoIP) call, a video call, text messaging, a file transfer, and/or combinations thereof. In at least some embodiments, a communication session represents a Unified Communication and Collaboration (UC&C) session.

According to various embodiments, a routing path for a communication session includes peering points between different networks. For instance, a local access provider (LAP) network can peer with a communication service network (e.g., a UC&C network) to enable communication sessions to be routed between devices connected to the different networks. In an event that performance degradation occurs in a communication session over a particular routing path, techniques discussed herein enable the communication session to be rerouted to a different routing path. The different routing path, for example, may be indicated as providing a higher quality data flow than the original routing path. Thus, rerouting the communication session can improve the quality of user experience during the communication session. As discussed herein, a communication session can be rerouted independent of user input and without interrupting or disconnecting the communication session.

In the following discussion, an example environment is first described that is operable to employ techniques described herein. Next, a section entitled "Propagating Attributes of Communication Sessions" discusses some example ways for notifying different communication components of attributes of communication sessions. Following this, a section entitled "Example Implementation Scenarios" describes some example implementation scenarios in accordance with one or more embodiments. Next, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

Figure 1:
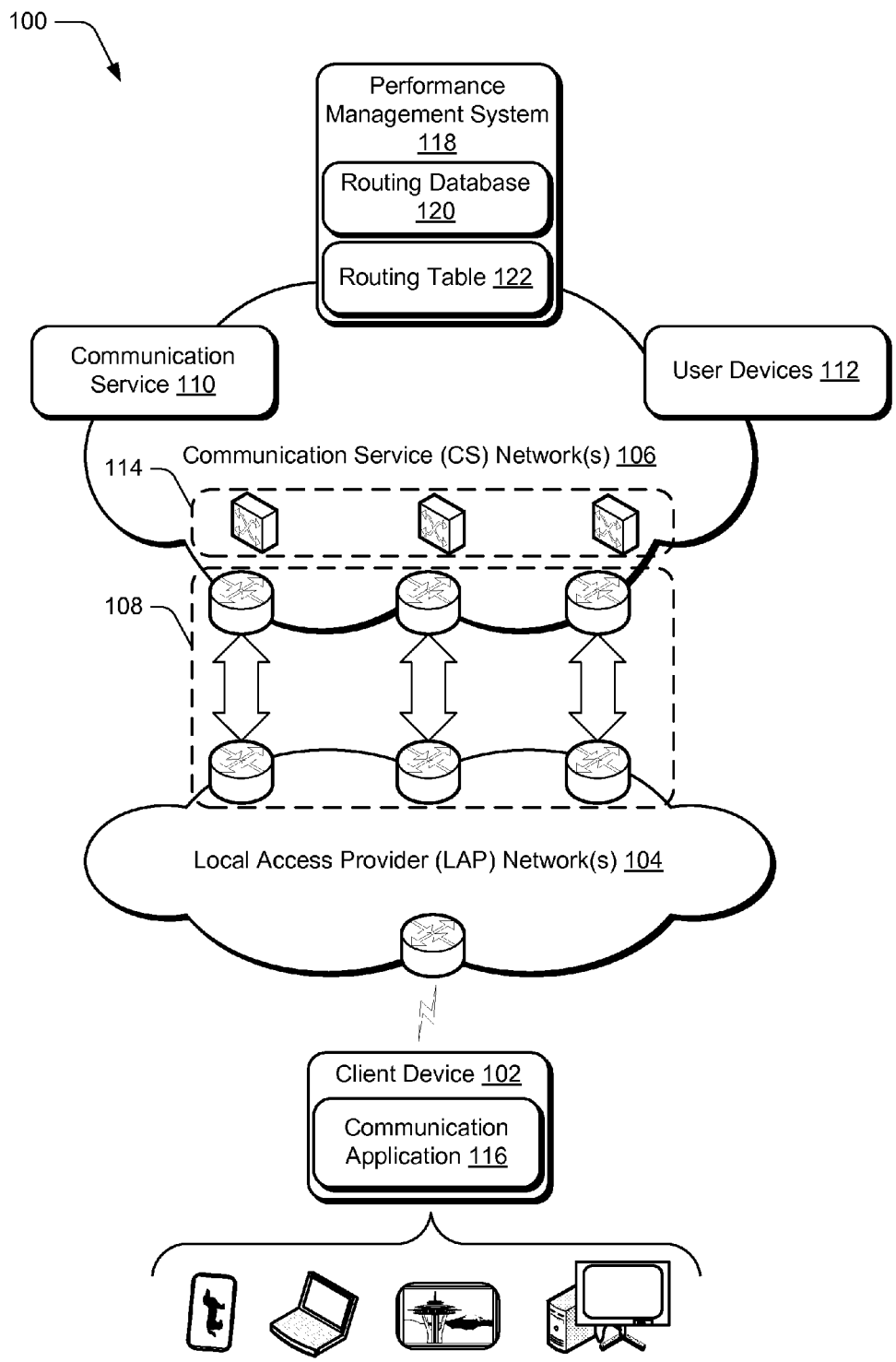
FIG. 1 is an illustration of an environment in an example implementation that is operable to employ techniques discussed herein.

FIG. 1 is an illustration of an environment 100 in an example implementation that is operable to employ techniques for path routing for communication sessions described herein. Generally, the environment 100 includes various devices, services, and networks that enable communication via a variety of different modalities. For instance, the environment 100 includes a client device 102 connected to a local access provider (LAP) network 104. The client device 102 may be configured in a variety of ways, such as a traditional computer (e.g., a desktop personal computer, laptop computer, and so on), a mobile station, an entertainment appliance, a smartphone, a netbook, a game console, a handheld device (e.g., a tablet), and so forth.

The LAP network 104 is representative of a network that provides the client device 102 with connectivity to various networks and/or services, such as the Internet. The LAP network 104 may be provided and/or managed by a particular enterprise entity, such as an Internet Service Provider (ISP). The LAP network 104 may provide the client device 102 with connectivity via a variety of different connectivity technologies, such as broadband cable, digital subscriber line (DSL), wireless data connectivity (e.g., WiFi™), T-carrier (e.g., T1), Ethernet, and so forth.

The LAP network 104 is connected to a communication service (CS) network 106 via routing paths 108. According to one or more embodiments, the CS network 106 is representative of different connected components that exchange, process, and/or route data to enable different forms of communication. The CS network 106, for example, enables transmission and receipt of voice data, video data, content data, and so forth. In at least some embodiments, the CS network 106 represents a Unified Communication and Collaboration (UC&C)-enabled network.

The routing paths 108 are representative of different data connections between the LAP network 104 and the CS network 106. Each of the routing paths 108, for instance, represents a different routing component and/or combination of routing components, such as routers, network switches, network elements (NEs), and so on. In at least some embodiments, the routing paths 108 include and/or represent individual peering points between the LAP network 104 and the CS network 106.

Connected to and/or implemented as part of the CS network 106 is a communication service 110, which is representative of a service to perform various tasks for management of communication between the client device 102 and user devices 112. The communication service 110, for instance, can manage initiation, moderation, and termination of communication sessions. According to one or more embodiments, the communication service 110 may implement and/or manage part or all of the CS network 106. Examples of the communication service 110 include a VoIP service, an online conferencing service, a UC&C service, and so forth. In at least some embodiments, the communication service 110 may be implemented as or be connected to a private branch exchange (PBX) in communication with a Public Switched Telephone Network ("PSTN") to enable voice communication between the client device 102 and user devices 112.

The routing paths 108 are associated with media relays 114, which are representative of functionality to route communication data from the routing paths 108 to the communication service 110, and from the communication service 110 to the routing paths 108. In at least some embodiments, each routing path 108 has a different respective media relay 114 that functions as a gateway to the communication service 110 from the LAP network 104.

In at least some embodiments, the client device 102 is configured to interface with the communication service 110 via a communication application 116 to enable communication between the client device 102 and the user devices 112. The communication application 116 is representative of functionality to enable different forms of communication via the client device 102. Examples of the communication application 116 include a voice communication application (e.g., a VoIP client), a video communication application, a messaging application, a content sharing application, and combinations thereof. The communication application 116, for instance, enables different communication modalities to be combined to provide diverse communication scenarios.

According to one or more embodiments, the communication application 116 represents an application that is installed on the client device 102. Additionally or alternatively, the communication application 116 can be implemented as a remote application, such as accessed via a web browser, a web application, and so forth.

The environment 100 further includes a performance management (PM) system 118, which is representative of functionality to manage various aspects of communications for the communication service 110 and/or the client device 102. The PM system 118, for instance, receives performance information from the media relays 114 concerning data connections across the routing paths 108. In response to various events (e.g., a bad session event), the PM system 118 is configured to dynamically configure and reconfigure communication paths across the routing paths 108 and/or other data paths, such as to accommodate changes in network connections.

According to one or more embodiments, the PM system 118 includes connectivity and logic that accesses routing information for the routing paths 108. For instance, the PM system 118 can access an Interior Gateway Protocol (IGP) and/or spanning tree switching topology for the CS network 106. This enables the PM system 118 to identify the different routing paths 108, and to map and remap the different routing paths 108 between the LAP network 104 and the CS network 106. The PM system 118 stores this information as part of a routing database 120, which is representative of functionality to track and store routing information for various networks.

In at least some embodiments, the PM system 118 characterizes the different routing paths 108 as being associated with respective instances of the media relays 114. For instance, each of the media relays 114 can be separately identifiable, such as via a respective identifier and/or address. Thus, the PM system 118 can leverage the media relays 114 to identify and differentiate the different routing paths 108, and can store this association between individual routing paths and individual media relays as part of the routing database 120.

The routing database 120 is further augmented with performance data from the routing paths 108, such as indications of data flow quality across the individual routing paths. For instance, individual of the routing paths 108 (as well as other routing paths) can be characterized in the routing database 120 based on historical session quality metrics. The quality metrics can be gathered automatically, such as based on notifications discussed herein from the communication service 110 and/or the communication application 116. Alternatively or additionally, the quality metrics may be received in response to user feedback regarding the quality of particular communication sessions. Thus, some of the routing paths 108 may be characterized in the routing database 120 as historically providing a higher quality user experience than others of the routing paths 108.

In at least some embodiments, the PM system 118 maintains active state awareness of the routing paths 108 via a routing table 122. For instance, the routing table 122 tracks connectivity attributes of the different routing paths 108 for active communication sessions, such as quality metrics for the individual routing paths 108. The routing table 122, for example, includes records for active communication sessions and dynamically updates the records, such as based on changes in routing path, changes in connection quality, and so forth. In at least some embodiments, data such as quality metrics from the routing table 122 can be used to update the routing database 120. For instance, quality metrics for individual routing paths 108 can be updated in the routing database 120 based on quality metrics obtained from the routing table 122.

As further detailed below, the routing database 120 and the routing table 122 can be leveraged to route and reroute communications across the routing paths 108, such as to perform route optimization for communication sessions. Further details and implementations of the various entities of the environment 100 are discussed below.

Having described an example environment in which the techniques described herein may operate, consider now a discussion of example ways of propagating various attributes of communication sessions in communication systems in accordance with one or more embodiments.

Propagating Attributes of Communication Sessions

According to various embodiments, techniques can be employed to dynamically enlighten various network components with information about communication sessions. For instance, notification events can be generated that include various attributes of communication sessions. The notification events can be propagated to different entities further to techniques for path routing for communication sessions discussed herein.

In at least some embodiments, notification events can be configured using an application programming interface (API) that can be leveraged to configure and communicate session information to various network components involved in a communication session. For example, the API can identify dialogue events and session events for which attributes of a communication session can be identified. Consider, for instance, the following events and attributes that may be conveyed via a notification event generated by the API:

Dialogue Events—These events apply to various portions of a communication session, such as the start, update, and end of a communication session. A dialogue event can include one or more of the following example attributes.

(1) Timestamp: This attribute can be leveraged to specify timestamps for a start of a communication session, updates that occur during a communication session, and an end (e.g., termination) of a communication session.

(2) Source IP Address: This attribute can be leveraged to specify an IP address for a device that is a source of media during a communication session, e.g., a device that initiates a communication session.

(3) Destination IP Address: This attribute can be leveraged to specify an IP address for a device that is to receive media as part of a communication session.

(4) Transport Type: This attribute can be leveraged to specify a transport type or combination of transport types for a communication session. Examples of transport types include Transmission Control Protocol (TCP), User Datagram Protocol (UDP), and so forth.

(5) Source Port: this attribute can be leveraged to specify an identifier for a port at a source device, e.g., a source device identified by the Source IP Address referenced above.

(6) Destination Port: This attribute can be leveraged to specify an identifier for a port at a destination device, e.g., a destination device identified by the Destination IP Address referenced above.

(7) Media Type: This attribute can be leveraged to specify a media type and/or types that are to be transmitted and/or are being transmitted as part of a communication session. As discussed elsewhere herein, the communication session can involve multiple different types of media. Thus, the Media Type attribute can be employed to identify media types in a communication session, such as for applying the service policies discussed herein.

(8) Bandwidth Estimation: This attribute can be leveraged to specify an estimated bandwidth that is to be allocated for a communication session. The estimated bandwidth, for instance, can be based on various factors, such as a privilege level associated with a user, type and/or types of media included in a communication session, and so forth.

(9) To: This attribute can be leveraged to identify a user to which media in a communication session is to be transmitted.

(10) From: This attribute can be leveraged to identify a user from which media and a communication session is transmitted.

(11) Error Code: This attribute can be leveraged to specify various error codes for pairs that may occur as part of a communication session. For example, errors can include errors that occur during initiation the communication session, errors that occurred during a communication session, errors that occur when a communication session is terminated, and so forth.

Session Problem Events—These events can be generated and applied when a communication session experiences errors, performance degradation, and so forth. A session problem event may include one or more of the attributes discussed above with reference to Dialogue Events, and may also include one or more of the following attributes.

(1) Mean Opinion Score (MOS) Degradation: This attribute can be leveraged to specify a MOS for a communication session. The attribute, for instance, can be used to indicate that an overall quality of a communication session has decreased.

(2) Jitter Inter-Arrival Time: This attribute can be leveraged to specify jitter values for a communication session.

The attribute, for instance, can be used to indicate that a jitter value or values have increased, e.g., have exceeded a specified jitter value threshold.

(3) Packet Loss Rate: This attribute can be leveraged to specify a packet loss rate for a communication session. The attribute, for instance, can be used to indicate that a packet loss rate has increased, e.g., has exceeded a specified packet loss rate value threshold.

(4) Round Trip Delay (RTD): This attribute can be leveraged to specify RTD values for packets in communication sessions. The attribute, for instance, can be used to indicate that RTD values for packets have increased, e.g., have exceeded a specified RTD value threshold.

(5) Concealment Ratio: This attribute can be leveraged to specify a cumulative ratio of concealment time over speech time observed after starting a communication session. The attribute, for instance, can be used to specify that a concealment ratio has increased, e.g., has exceeded a specified concealment ratio value threshold.

Thus, various notifications discussed herein can include one or more of the attributes discussed above and can be used to propagate the attributes to various entities.

Having described an example ways of propagating attributes of communication sessions, consider now some example implementation scenarios for path routing for communication sessions in accordance with one or more embodiments.

Example Implementation Scenarios

The following section describes example implementation scenarios for path routing for communication sessions in accordance with one or more embodiments. The implementation scenarios may be implemented in the environment 100 discussed above, and/or any other suitable environment.

Figure 2:
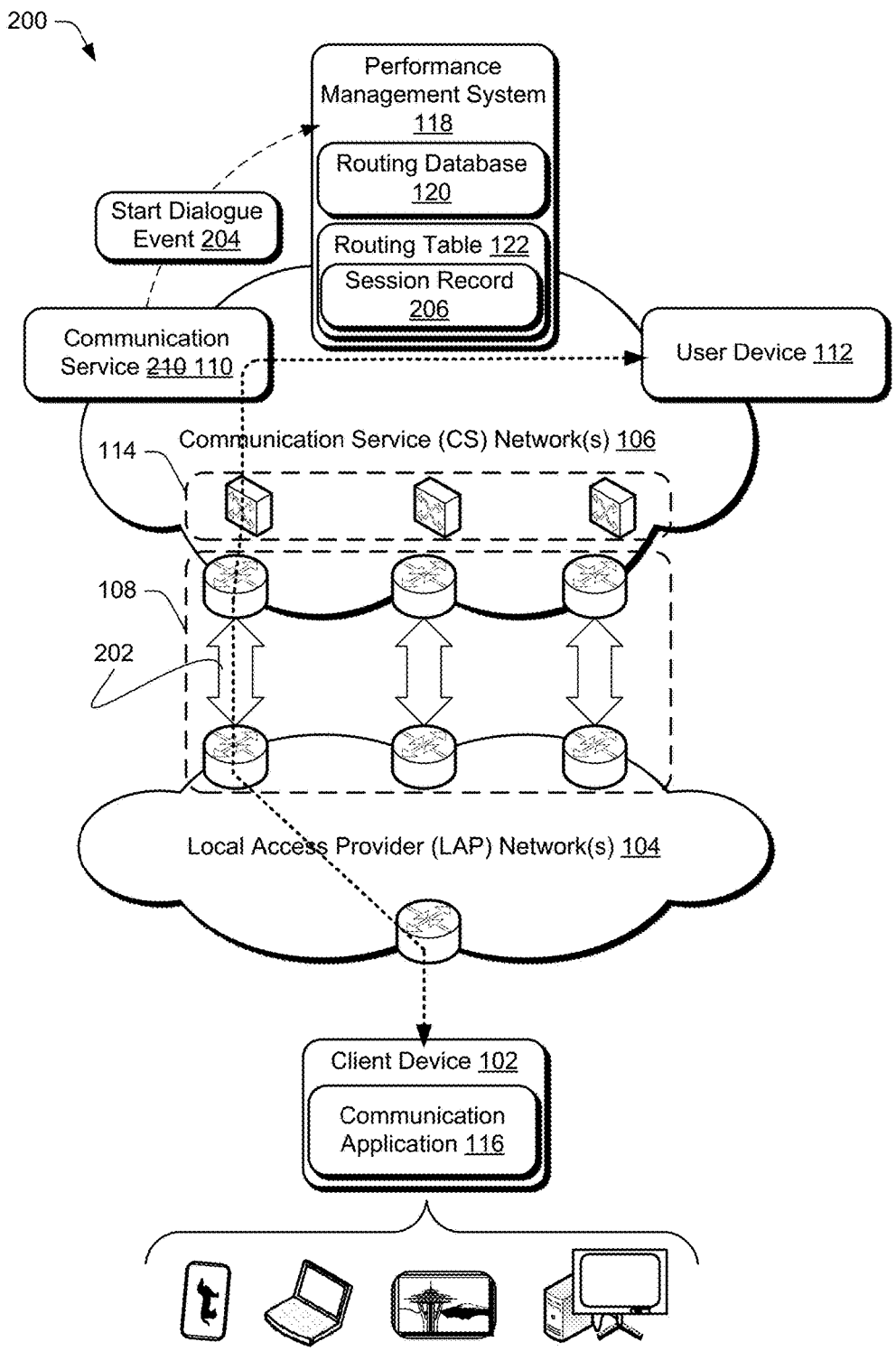
FIG. 2 illustrates an example implementation scenario in accordance with one or more embodiments.

FIG. 2 illustrates an example implementation scenario for initiating communication session generally at 200. The scenario 200 includes various entities and components introduced above with reference to the environment 100.

In the scenario 200, a user logs the client device 102 into the communication service 110 via the communication application 116. The user then enters a request to initiate a communication session with the user device 112. For instance, the user selects an indicia indicating a request to initiate the communication session, such as by entering a phone number for the user device 112, selecting a contact from a contact list, selecting a hyperlink for a communication application of the user device 112, and so forth.

As part of initiating the call, the communication application 116 queries the communication service 110 for path information for routing communication data from the client device 102 to the user device 112. The communication service 110 determines a set of path candidates (e.g., Interactive Connectivity Establishment (ICE) candidates and/or other types of path candidates), such as set of identifiers for different components of the routing paths 108. In at least some embodiments, each path candidate corresponds to a discrete instance of the routing paths 108, and represents an available path for routing data between the LAP network 104 and the CS network 106.

Based on the set of path candidates, a routing path 202 is selected for routing communication data from the client device 102 to the CS network 106, such that the data can be routed to the user device 112 as part of a communication session. The routing path 202 can be derived from the routing paths 108 using any suitable algorithm, such as a shortest path algorithm determined by the communication service 110 for the client device 102. In at least some embodiments, the routing path 202 is derived using logic that considers the LAP network 104 and the preferred media relays to be used for the session, considered in order of a routing distance metric, e.g., shortest path listed first.

As part of initiating the communication session, the communication service 110 sends a start dialogue event 204 to the PM system 118. The start dialogue event 204 includes information to uniquely identify the communication session across the network topology. For instance, the API referenced above can be used to communicate attributes to the communication session, such as Source and Destination IP addresses, Port numbers, Session type, codec, bandwidth requirement, and so forth.

Information from the start dialogue event 204 is stored by the PM system 118 as a session record 206 in the routing table 122. The session record 206 is used to identify the communication session in the routing table 122, such as via identification information from the dialogue event 204.

The session record 206 is also leveraged to track information about the communication session, such as performance attributes of data flow across the routing path 202 during the communication session. For instance, during the communication session, the PM system 118 can dynamically update the session record 206 with performance statistics for the communication session, such as received from the communication service 110 and/or the communication application 116. Examples of such performance statistics include values for packet throughput rate, bandwidth across the routing path 202, jitter, packet latency, user input regarding performance quality, and so forth.

Further to the scenario, the communication application 116 negotiates transversal of the routing path 202 to reach the communication service 110. A media stream between the communication application and the communication service 110 and/or the user device 112 is established such that media data can be transmitted between the client device 102 and the user device 112 as part of a communication session.

In at least some embodiments, the routing path 202 is designated as a default routing path between the client device 102 and the communication service 110, such as in the routing database 120. Thus, the routing path 202 can be used to route communication session data from the client device 102 unless rerouting occurs further techniques for path routing for communication sessions discussed herein.

Figure 3:
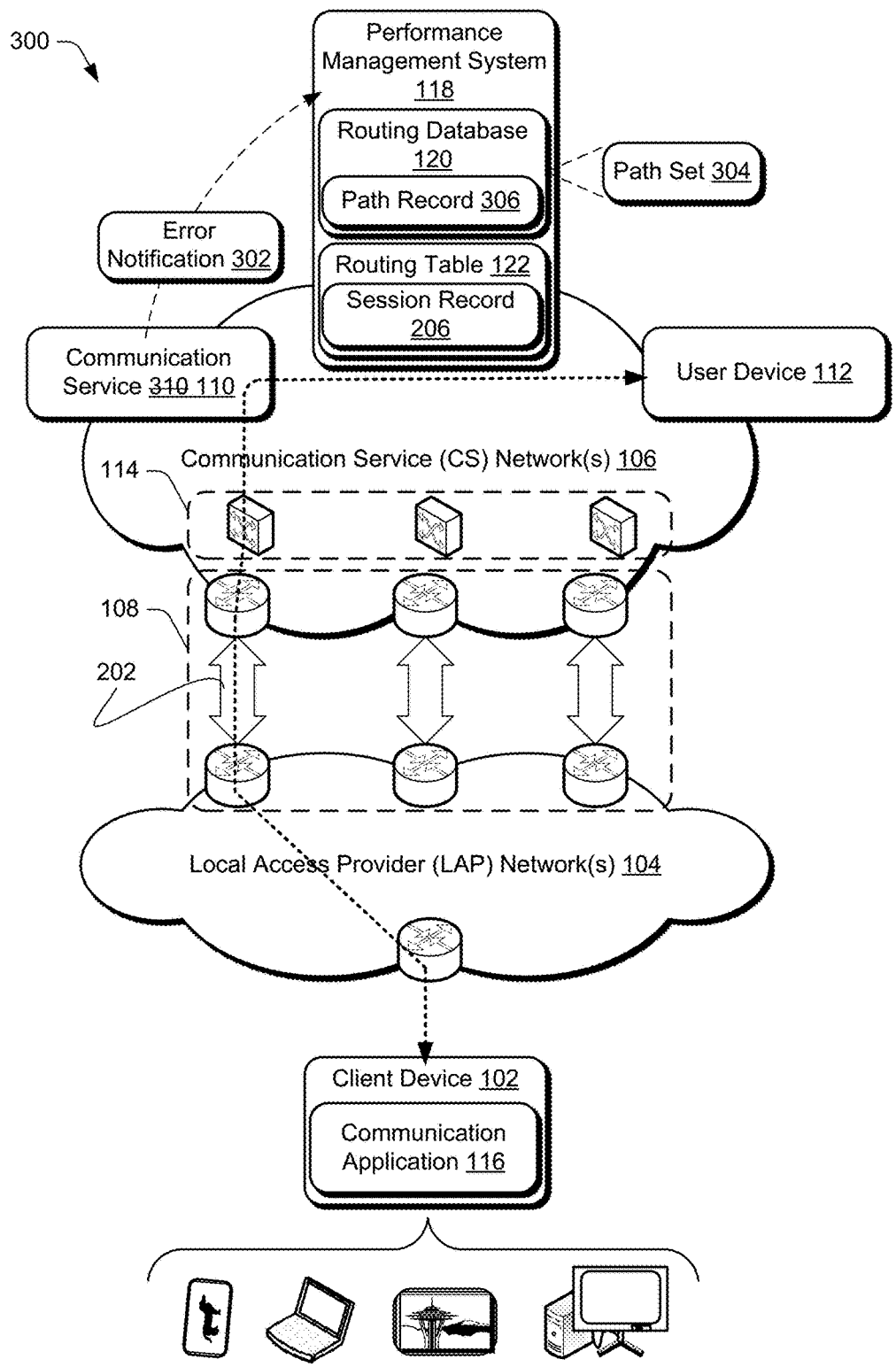
FIG. 3 illustrates an example implementation scenario in accordance with one or more embodiments.

FIG. 3 illustrates an example implementation scenario for detecting performance degradation in a communication session generally at 300. In at least some embodiments, the scenario 300 generally represents a continuation of the scenario 200, above.

During the established communication session over the routing path 202, an indication of performance degradation in the data flow is generated. For instance, one or more attributes of the communication session may trigger an indication of performance degradation. Examples of such attributes include jitter values, packet loss, packet latency, and so forth, exceeding a specified threshold value and/or values. Other examples of attributes that may indicate performance degradation include bandwidth of one or more components of the routing path 202 falling below a specified threshold, an error message from a component of the routing path 202 (e.g., a media relay, a switch, a router, and so on), input from a user indicating performance degradation in the communication session, and so forth. The performance degradation may detected by various components, such as the communication service 110 and/or the communication application 106.

In response to detecting the performance degradation, the communication service 110 sends an error notification 302 to the PM system 118. The error notification 302 includes various attributes of the communication session, and can be generated using the API referenced above. For instance, the error notification 302 includes information from the start dialogue event 204, and/or attributes of the communication session that resulted in the indication of performance degradation. Based on identification information included in the error notification 302 (e.g., IP addresses for the client device 102 and/or the user device 112), the PM system 118 matches the error notification 302 to the session record 206 for the communication session.

In response to receiving the error notification 302, the PM system 118 queries the routing database 120 and/or the routing table 122 for a different routing path 108 for rerouting the communication session from the routing path 202. For instance, historical path data from the routing database 120 may be searched, and/or active path data from the routing table 122 for active communication sessions. The PM system 118, for instance, identifies a path set 304 that includes a set of the routing paths 108 between the client device 102 and the CS network 106. The routing paths 108, for instance, are filtered to include routing paths that are indicated as having an acceptable level of session quality, such as based on the various session metrics discussed herein. The problematic routing path 202 is excluded from the path set 304. In at least some embodiments, the individual routing paths of the path set 304 are identified based on their respective media relays 114. Example ways of identifying and filtering routing path candidates are discussed below.

Further to the scenario 300, the PM system 118 forwards the path set 304 to the communication service 110 and/or the communication application 116.

According to one or more embodiments, the PM system 118 logs data from the error notification 302 as part of a path record 306 in the routing database 120. For example, the path record 306 includes quality metrics for data flow over the routing path 202. The path record 306 may include a quality indicator for the routing path 202, such as an indication that performance degradation occurred over the routing path 202 such that a communication session was rerouted away from the routing path 202. Thus, the routing path 202 may be designated by the path record 306 as a less preferred routing path as compared to other path records of the routing database 120.

Figure 4:
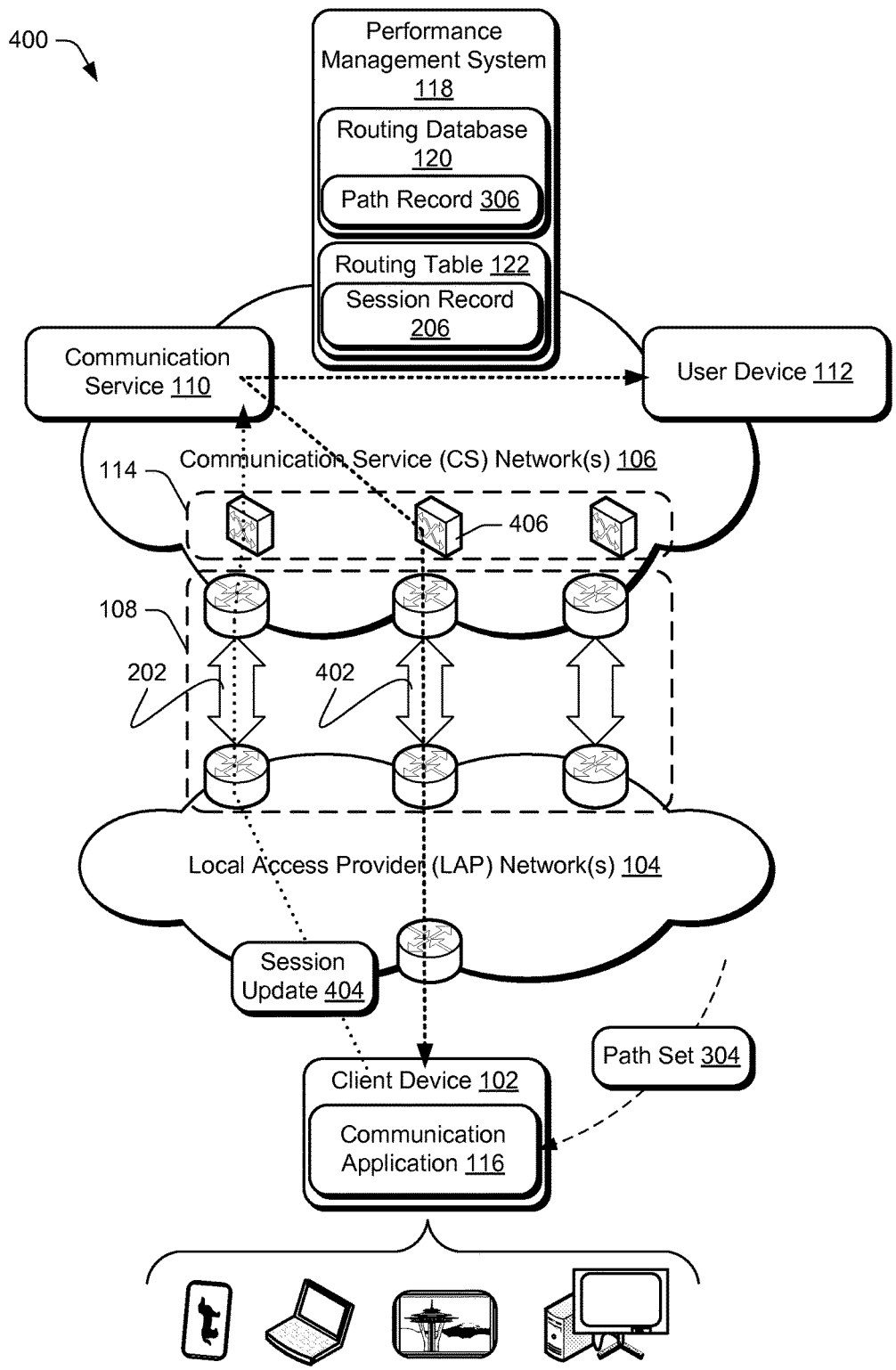
FIG. 4 illustrates an example implementation scenario in accordance with one or more embodiments.

FIG. 4 illustrates an example implementation scenario for rerouting a communication session generally at 400. In at least some embodiments, the scenario 400 generally represents a continuation of the scenario 300, above.

In the scenario 400, the communication application 116 receives the path set 304 and selects a routing path 402 from the path set 304. The routing path 402 can be selected based on various criteria, such as the shortest path from among the path set 304, the routing path with the highest quality metrics, and so forth. Thus, the routing path 402 may be longer than the original routing path 202 from a data routing perspective, but may be associated with higher connection and/or data flow quality metrics.

Using the routing path 402, the communication application 116 sends a session update 404 to the communication service 110 (e.g., via the routing path 202) to establish a new media path for the communication session via the routing path 402. The session update 404 identifies the media relay 406 associated with the routing path 402, and which serves a gateway for the client device 102 to the CS network 106. Connection negotiation is then performed between the client device 102, the components of the routing path 402, and the communication service 110 to switch the communication session from the routing path 202 to the routing path 402. The communication session, for instance, is switched from a media relay for the routing path 202 to the media relay 406 of the routing path 402. Thus, data flow for the communication session may continue uninterrupted via the routing path 402.

According to various embodiments, the negotiation and switching occurs without disconnecting and/or interrupting the communication session, independent of user input, and/or independent of a user being notified. Thus, seamless rerouting can be effected with little or no impact on a user experience during a communication session.

Figure 5:
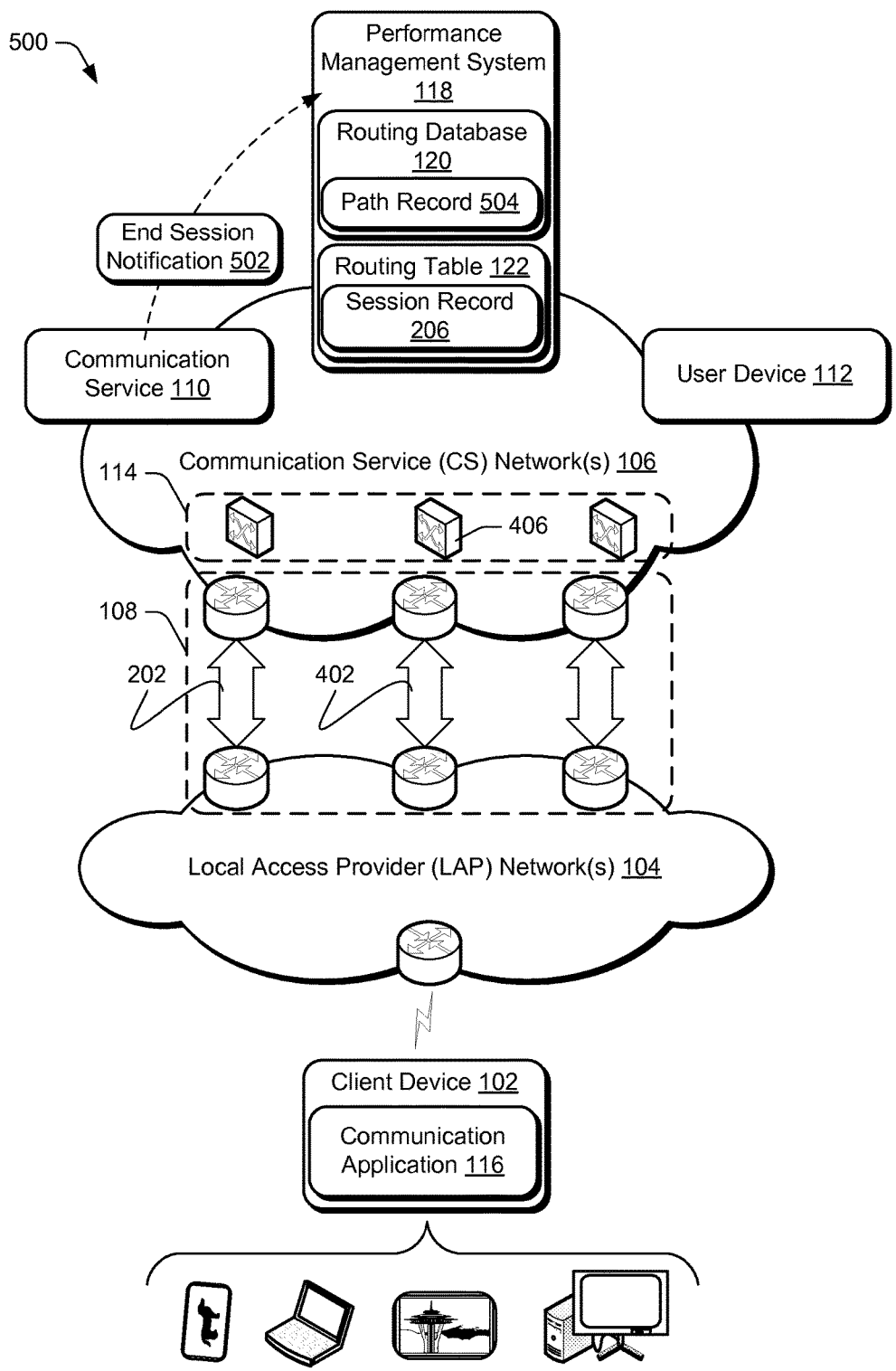
FIG. 5 illustrates an example implementation scenario in accordance with one or more embodiments.

FIG. 5 illustrates an example implementation scenario for terminating a communication session generally at 500. In at least some embodiments, the scenario 500 generally represents a continuation of the scenario 400, above.

In the scenario 500, the ongoing communication session is terminated, such as by a user of the client device 102. In response to the termination, the communication service 110 sends an end session notification 502 to the PM system 118. The end session notification 502 includes various attributes of the communication session, such as utilizing the API discussed above populated with the different attributes.

The end session notification 502 includes, for instance, quality metrics for the communication session. Examples of quality metrics include packet throughput rate, bandwidth across the routing path 402, jitter, packet latency, user input regarding performance quality, and so forth. In at least some embodiments, the values for the quality metrics can be averaged over the duration of the communication session.

Further to the scenario 500, the PM system 118 logs information from the end session notification 502 as part of a path record 504 in the routing database 120. The path record 504 includes attributes of the routing path 402, such as the quality metrics discussed above. Based on the quality metrics, the path record 504 can specify a relative quality rating for the routing path 402. The PM system 118, for instance, can rank the routing path 402 based on its relative quality and in comparison to other routing paths that are recorded in the routing database 120. The ranking can be stored as part of the path record 504 such that the PM system 118 can subsequently determine a ranking of the routing path 402 relative to other routing paths. For instance, when a different communication session is to be rerouted (e.g., based on performance degradation), the PM system 118 can reference the path record 504 along with other path records from the routing database 120 to assemble a set of path candidates for rerouting the different communication session.

The example implementation scenarios presented above are discussed with reference to discrete devices and discrete sets of routing paths for purpose of example only. It is to be appreciated, however, that embodiments may be employed in a variety of different networks and with multiple different devices not expressly discussed herein. The various transactions discussed with respect to the client device 102, for example, may also occur with other devices (e.g., the user devices 112) during a communication session. Further, connection scenarios are often dynamically changing, and thus techniques discussed herein may be applied dynamically to map and remap routing paths, and to dynamically update quality metrics for routing paths to account for changes in connection attributes.

Having discussed some example implementation scenarios, consider now a discussion of some example procedures in accordance with one or more embodiments.

Example Procedures

The following discussion describes some example procedures for path routing for communication sessions in accordance with one or more embodiments. The example procedures may be employed in the environment 100 of FIG. 1, the system 1000 of FIG. 10, and/or any other suitable environment. In at least some embodiments, the steps described for the various procedures can be implemented automatically and independent of user interaction.

Figure 6:
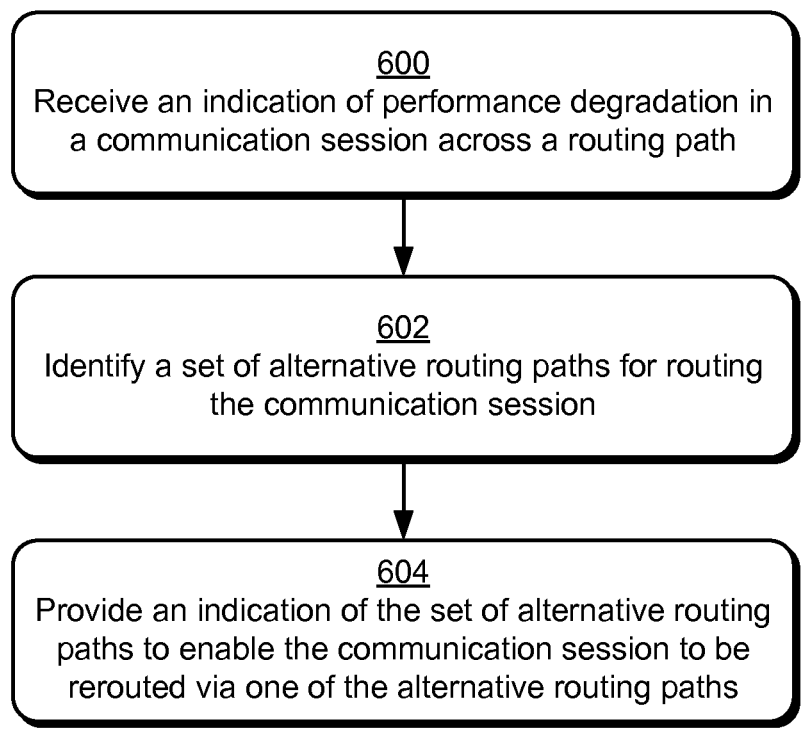
FIG. 6 is a flow diagram that describes steps in a method in accordance with one or more embodiments.

FIG. 6 is a flow diagram that describes steps in a method in accordance with one or more embodiments. The method describes an example procedure for rerouting a communication session in accordance with one or more embodiments.

Step 600 receives an indication of performance degradation in a communication session across a routing path. With reference to the environment 100, for example, the indication may be received as a notification from the communication service 110 and/or the communication application 116. The indication can include various attributes of the communication session, such as discussed above with reference to the error notification 302.

Step 602 identifies a set of alternative routing paths for routing the communication session. According to one or more embodiments, the set of routing paths may be identified from historical routing path records (e.g., from the routing database 120), and/or from routing path information for currently active communication sessions, such as from the routing table 122. The set of routing paths, for instance, may be identified based on relative quality metrics for the individual routing paths. Example ways of identifying routing path candidates are discussed above and below.

Step 604 provides an indication of the set of alternative routing paths to enable the communication session to be rerouted via one of the alternative routing paths. The PM system 118, for instance, can provide identifiers for the set of alternative routing paths to the communication service 110 and/or the communication application 116. Examples of such identifiers include identifiers for components of the routing paths, such as media relays of the routing paths. The communication service 110 and/or the communication application 116 can select a routing path from the set and reroute the communication session via the selected routing path.

Figure 7:
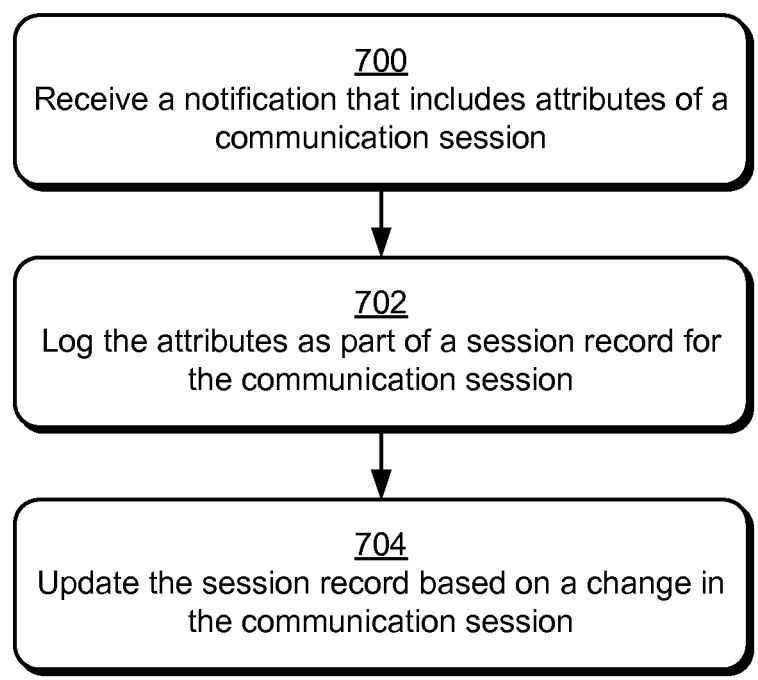
FIG. 7 is a flow diagram that describes steps in a method in accordance with one or more embodiments.

FIG. 7 is a flow diagram that describes steps in a method in accordance with one or more embodiments. The method describes an example procedure for logging attributes of communication sessions in accordance with one or more embodiments. The method, for instance, can be employed to generate session records for the routing table 122.

Step 700 receives a notification that includes attributes of a communication session. The notification, for instance, can be structured based on the API detailed above. The notification indicates that a communication session has been initiated between devices, and includes identifiers for the devices involved in the communication session, such as IP addresses for an initiating device, a destination device, and so forth. The notification may also include identifiers for components of a routing path for the communication session, such as identifiers for switches, NEs, and so on. As referenced above, routing paths can be individually associated with a particular media relay. Thus, the notification can include an identifier for a media relay for the particular routing path specified for the communication session.

Step 702 logs the attributes as part of a session record for the communication session. A session record, for instance, is created for the communication session and populated with the various attributes. As discussed above, the routing table 122 includes session records that individually correspond to different communication sessions. Thus, the PM system 118 can leverage the routing table 122 to track communication sessions involving multiple different sets of client devices and/or multiple different networks.

Step 704 updates the session record based on a change in the communication session. For instance, in response to the communication session being rerouted to a different routing path, the session record can be updated with routing information for the different routing path. The session record, for example, can be updated to with an identifier for a media relay associated with the different routing path.

According to one or more embodiments, the session record may track performance metrics for the communication session. Thus, changes in performance values for a communication session and/or a routing path (e.g., bandwidth, packet latency, jitter, delay, and so forth) can be logged in the session record. Accordingly, the session record may include current, average, and/or historical performance metrics for the communication session.

Figure 8:
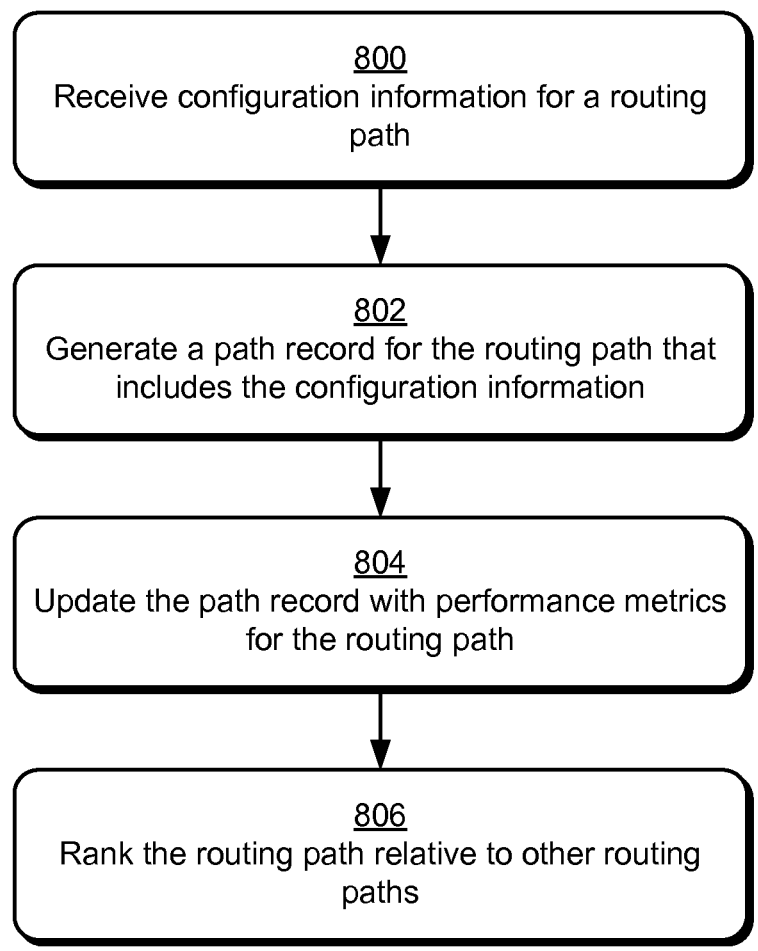
FIG. 8 is a flow diagram that describes steps in a method in accordance with one or more embodiments.

FIG. 8 is a flow diagram that describes steps in a method in accordance with one or more embodiments. The method describes an example procedure for logging performance metrics for routing paths in accordance with one or more embodiments. The method, for instance, can be employed to generate path records for the routing database 120.

In at least some embodiments, the method can be implemented to create path records based on session records generated as discussed above. For instance, a path record can be generated based on a session record for a communication session while the session is in progress. Alternatively or additionally, a path record can be generated when a communication session is terminated, e.g., as discussed above with reference to FIG. 5. Thus, in at least some embodiments a path record for a particular routing path can be populated with information from a session record for a communication session that is occurring and/or occurred across the routing path.

Step 800 receives configuration information for a routing path. The configuration information generally includes sufficient information to identify a routing path and to distinguish the routing path from other routing paths. The configuration information, for instance, includes identifiers for various components included in the routing path, such as for a media relay for the routing path. In at least some embodiments, the configuration information can be received via the API described above.

Step 802 generates a path record for the routing path that includes the configuration information. The PM system 118, for instance, generates a path record in the routing database 120 that corresponds to the routing path and that includes the configuration information. Thus, the path record can be leveraged to differentiate the routing path from other routing paths identified in the routing database 120.

Step 804 updates the path record with performance metrics for the routing path. The performance metrics, for example, characterize data flow across the routing path. Examples of various performance metrics are discussed above. In at least some embodiments, the performance metrics are received based on performance metrics for a communication session. For instance, the performance metrics can be propagated from a session record for an active communication session (e.g., from the routing table 122), such as dynamically while the communication session is active. Alternatively or additionally, the performance metrics can be received when a communication session across the routing path is terminated, such as part of the end session notification referenced above.

Thus, a path record for a routing path may provide a historical indication of session quality of a routing path, such as based on one or multiple communication sessions that have occurred across the routing path. Alternatively or additionally, a path record may include performance metrics for active communication sessions across a routing path, and thus may be dynamically updated to reflect changes in data flow quality in a routing path.

Step 806 ranks the routing path relative to other routing paths. The PM system 118, for instance, can rank the routing path relative to other routing paths tracked by the routing database 120. In at some embodiments, the routing database 120 can include rankings of different routing paths and/or routing components, such as different media relays. Thus, when a routing path is requested (e.g., for rerouting a communication session), a routing path can be selected based on its ranking.

According to one or more embodiments, routing paths can be ranked based on their respective quality metrics. For instance, a routing path with lower values for packet errors such as jitter, packet latency, packet drop, and so forth, can be ranked higher than another routing path with higher values for such errors. Further, a routing path with higher values for data flow attributes such as packet throughput, bandwidth, and so on, can be ranked higher than another routing path with lower values for such data flow attributes. Thus, a ranking can indicate a relative quality of a routing path as compared to other routing paths.

In at least some embodiments, a routing path can be dynamically ranked and re-ranked, such as based on changes in quality metrics for the routing path. For instance, if a routing path experiences performance degradation, a ranking for the routing path can be recalculated (e.g., decreased) to reflect the performance degradation. Alternatively or additionally, if a routing path experiences an increase in performance, such as an increase in a performance metric value, a ranking for the routing path can be recalculated (e.g., increased) to reflect the performance enhancement.

Figure 9:
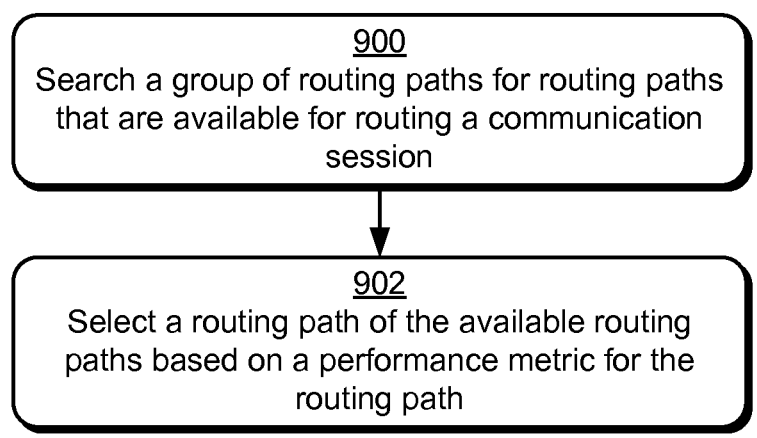
FIG. 9 is a flow diagram that describes steps in a method in accordance with one or more embodiments.

FIG. 9 is a flow diagram that describes steps in a method in accordance with one or more embodiments. The method describes an example procedure for selecting a routing path for routing and/or rerouting a communication session in accordance with one or more embodiments. The method, for instance, represents a detailed implemented of step 602 of FIG. 6, discussed above.

Step 900 searches a group of routing paths for routing paths that are available for routing a communication session. The PM system 118, for instance, can search the routing database 120 and/or the routing table 122 for routing paths that are available for routing a communication session from the device 102 to the CS network 106 and/or the user device 112.

Step 902 selects a routing path of the available routing paths based on a performance metric for the routing path. For instance, a routing path with a highest ranking can be selected. As discussed above, the ranking can be based on a quality of data flow across the routing path as compared to other available routing paths. In at least some embodiments, a set of routing path candidates can be selected, e.g., based on their ranking relative to other routing paths. The set of routing path candidates can be provided (e.g., to the communication service 110 and/or the communication application 116) to enable a communication session to be routed and/or rerouted.

Having discussed some example procedures, consider now a discussion of an example system and device in accordance with one or more embodiments.

Example System and Device

Figure 10:
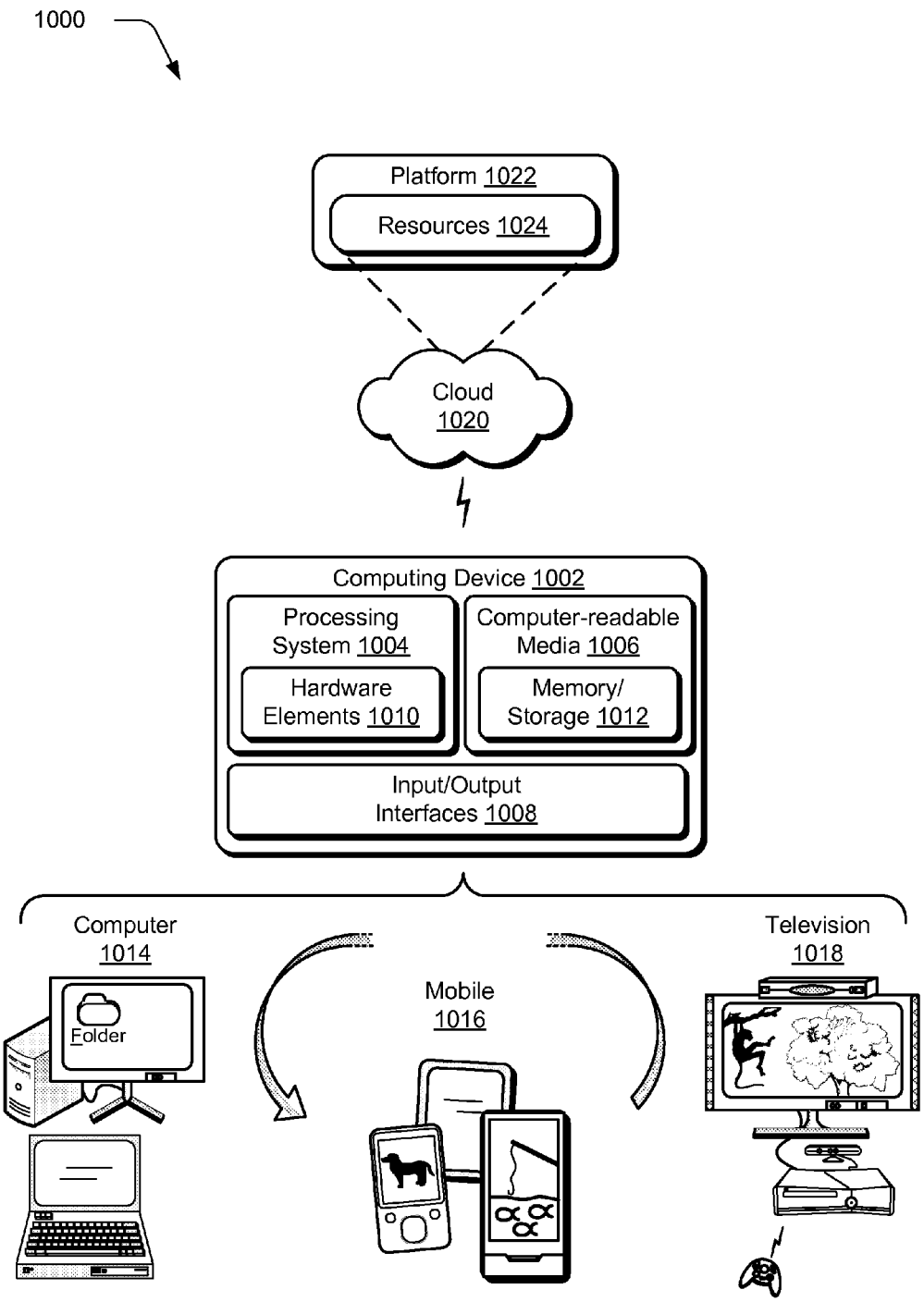
FIG. 10 illustrates an example system and computing device as described with reference to FIG. 1, which are configured to implement embodiments of techniques described herein.

FIG. 10 illustrates an example system generally at 1000 that includes an example computing device 1002 that is representative of one or more computing systems and/or devices that may implement various techniques described herein. For example, the client device 102 and/or the user devices 112 discussed above with reference to FIG. 1 can be embodied as the computing device 1002. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more Input/Output (I/O) Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth.

Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules that are executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. For example, functionalities discussed with reference to the communication service 110, the communication application 116, and/or the performance management system 118 may be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for path routing for communication sessions are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A cloud-based performance system comprising:
at least one processor; and
one or more computer-readable storage media including instructions stored thereon that, responsive to execution by the at least one processor, cause the cloud-based performance system to perform operations including:
receiving, at the cloud-based performance system, a notification indicating performance degradation in a communication session across a current routing path, the notification received via a data flow that is different from a data flow of the communication session;
identifying an alternative routing path for routing the communication session by:
searching within a set of routing path data for available routing paths that are available for routing the communication session, the available routing paths being dynamically ranked based on quality metrics for the available routing paths; and
selecting an alternative routing path from the available routing paths based on one or more performance metrics for the alternative routing path, said selecting the alternative routing path based on a comparison of rankings of individual routing paths of the available routing paths tracked by a routing database; and
communicating from the cloud-based performance system an indication of the alternative routing path to enable the communication session to be rerouted via the alternative routing path.

2. A cloud-based performance system as recited in claim 1, wherein the notification indicating performance degradation comprises an error notification received from at least one of a communication service or a client device involved in the communication session.

3. A cloud-based performance system as recited in claim 1, wherein said identifying comprises excluding the current routing path from the available routing paths.

4. A cloud-based performance system as recited in claim 1, wherein the operations further comprise, responsive to said receiving, locating a session record for the communication session based on one or more device identifiers included with the notification, and wherein the available routing paths comprise routing paths that are available to route the communication session between devices included in the communication session.

5. A cloud-based performance system as recited in claim 1, wherein individual routing paths of the available routing paths include one or more peering points between two or more separate networks.

6. A cloud-based performance system as recited in claim 1, wherein said searching comprises searching the routing database that includes path records for the available routing paths, the path records being generated based on communication sessions across individual routing paths of at least some routing paths of the available routing paths.

7. A cloud-based performance system as recited in claim 1, wherein said searching comprises searching a routing table that includes session records for active communication sessions across at least some routing paths of the available routing paths.

8. A cloud-based performance system as recited in claim 1, wherein the one or more performance metrics for the alternative routing path are based on one or more values for one or more of jitter, packet drop, or packet latency across the alternative routing path.

9. A cloud-based performance system as recited in claim 1, wherein the one or more performance metrics for the alternative routing path are based on user input indicating relative quality of experience for one or more communication sessions across the alternative routing path.

10. A cloud-based performance system as recited in claim 1, wherein said communicating comprises communicating an identifier for the alterative routing path for receipt by one or more devices involved in the communication session.

11. A cloud-based performance system as recited in claim 1, wherein the operations further comprise logging the performance degradation as part of a path entry for the current routing path in the routing database.

12. A computer-implemented method, comprising:
receiving, at a cloud-based performance system, a notification indicating performance degradation in a communication session across a routing path and while the communication session is active, the notification received via a data flow that is different from a data flow of the communication session;
searching, via instructions executed by one or more processors, within a set of routing path data for available routing paths that are available for routing the communication session, the available routing paths being dynamically ranked based on quality metrics for the available routing paths;
selecting an alternative routing path from the available routing paths based on a performance metric for the alternative routing path, said selecting the alternative routing path based on a comparison of rankings of individual routing paths of the available routing paths tracked by a routing database; and
communicating from the cloud-based performance system an indication of the one or more alternative routing paths to cause the communication session to be rerouted via the one or more alternative routing paths without interrupting the communication session.

13. A method as described in claim 12, wherein the notification indicating performance degradation indicates one or more of an increase in one or more of jitter, packet delay, or packet drop in the communication session.

14. A method as described in claim 12, wherein said searching comprises:
matching information included with the indication of performance degradation to a session record for the communication session: and
identifying the one or more alternative routing paths as routing paths that are available to route communications from at least one device involved in the communication session.

15. A method as described in claim 12, wherein said searching comprises identifying the one or more available routing paths from one or more of:
session records for active communication sessions; or
path records generated based on communication sessions across individual routing paths of the available routing paths.

16. A computer-implemented method, comprising:
receiving, at a cloud-based system, an error notification indicating performance degradation in a communication session across a current routing path and while the communication session is active, the error notification received via a data flow that is different from a data flow of the communication session and identifying a client device involved in the communication session;
identifying, via instructions executed by one or more processors, an alternative routing path for routing the communication session by searching path records for routing paths that include performance metrics for the routing paths, the routing paths being dynamically ranked in the path records based on performance metrics for the routing paths;
selecting the alternative routing path based on a performance metric for the alternative routing path, said selecting the alternative routing path based on a comparison of rankings of the individual routing paths tracked by a routing database; and
forwarding a path set notification that identifies the one or more alternative routing paths to one or more of a communication service that manages the communication session for the client device, or a communication application that resides on the client device, said forwarding causing the communication session to be rerouted to an alternative routing path of the one or more alternative routing paths.

17. A method as described in claim 16, wherein the path set notification identifies one or more media relays of the one or more alternative routing paths.

18. A method as described in claim 16, wherein the notification indicating performance degradation indicates one or more of an increase in one or more of jitter, packet delay, or packet drop in the communication session.

19. A method as described in claim 16, wherein the error notification is received from at least one of a communication service or the client device involved in the communication session.

20. A method as described in claim 16, wherein said identifying comprises excluding the current routing path as the available routing path.

* * * * *